Feb. 22, 1944.　　　W. H. CARRIER　　　2,342,328
VALVE ARRANGEMENT
Filed Dec. 27, 1941　　　2 Sheets-Sheet 1
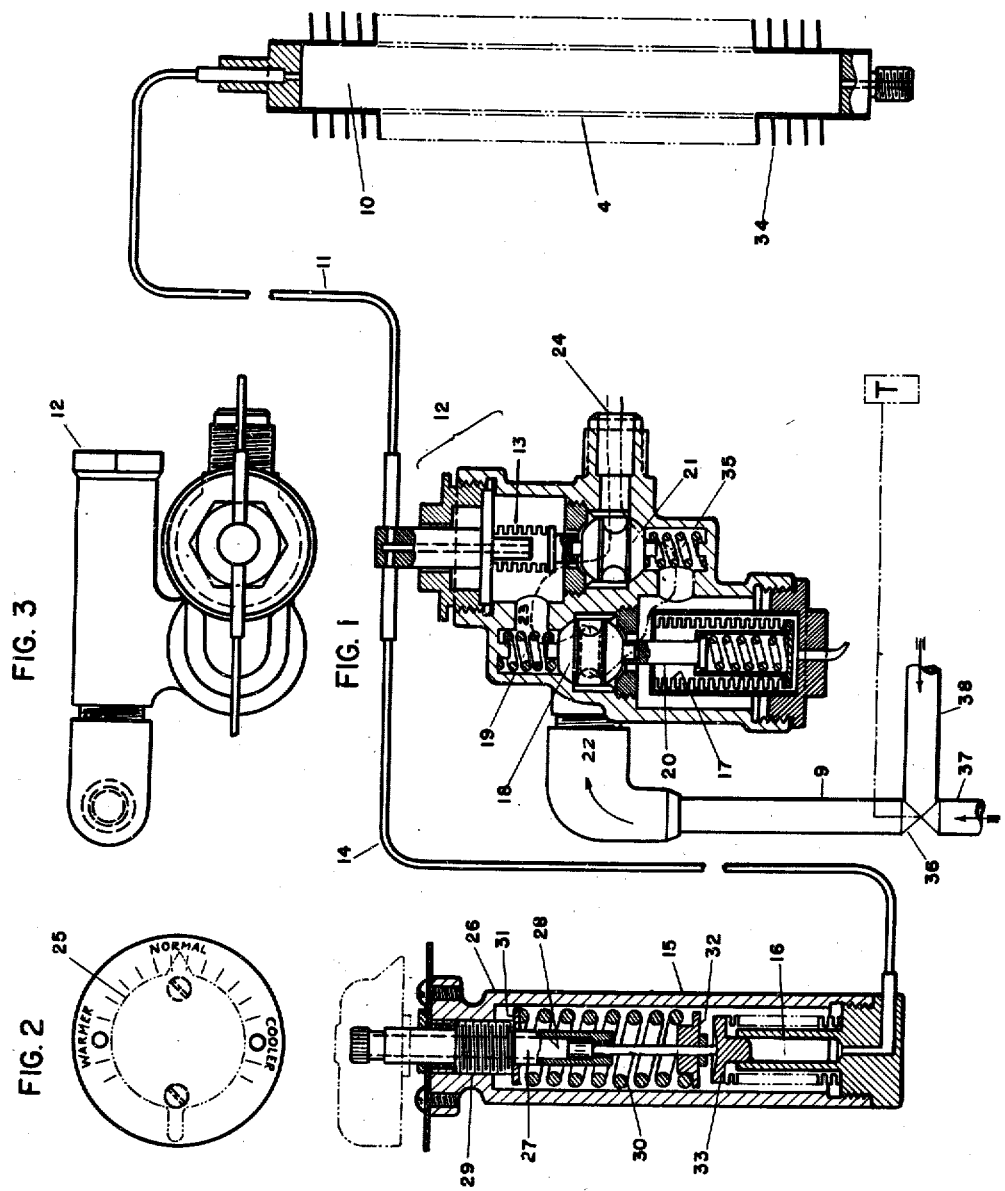
INVENTOR.
WILLIS H. CARRIER
BY
ATTORNEY.

Feb. 22, 1944.  W. H. CARRIER  2,342,328
VALVE ARRANGEMENT
Filed Dec. 27, 1941  2 Sheets-Sheet 2
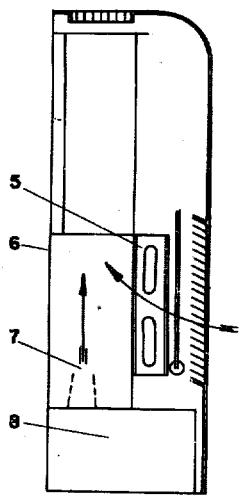
FIG.-5
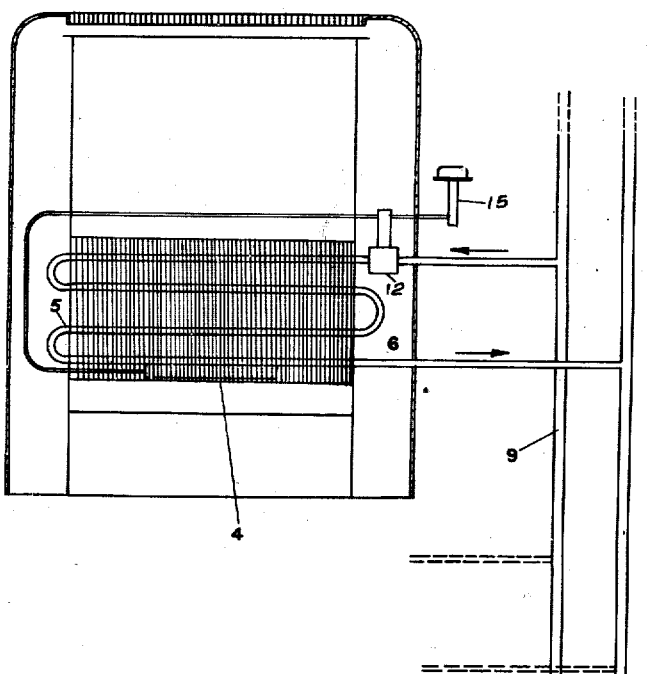
FIG.-4
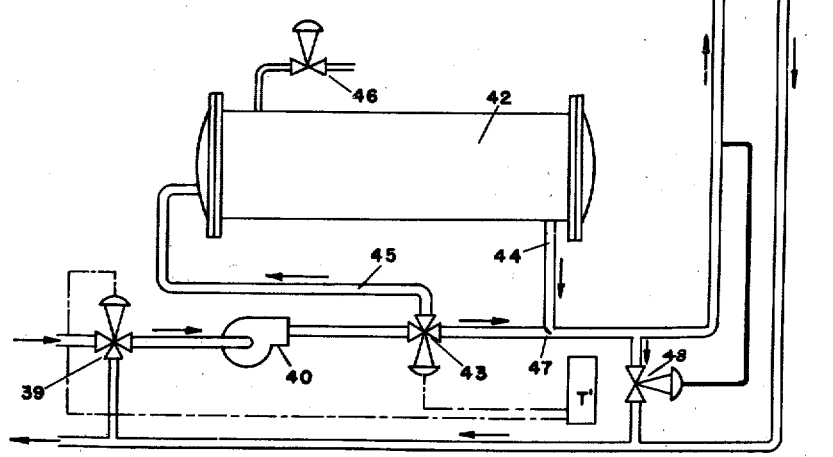
INVENTOR.
WILLIS H. CARRIER
BY
ATTORNEY.

Patented Feb. 22, 1944

2,342,328

UNITED STATES PATENT OFFICE 2,342,328

VALVE ARRANGEMENT

Willis H. Carrier, Syracuse, N. Y., assignor to Carrier Corporation, Syracuse, N. Y., a corporation of Delaware Application December 27, 1941, Serial No. 424,577

11 Claims. (Cl. 236—1)

This invention relates to a system of control for use in producing and maintaining desired atmospheric conditions, and more particularly relates to valve structures and auxiliary devices designed to reflect changes in air conditions and cause desired compensation for variation in such conditions beyond predetermined maximum and minimum limits during all seasons of the year.

The general object of the invention is to provide a system of control for use in tempering air delivered from a central conditioning source to a plurality of points of distribution. At the central conditioning source, the air may be desirably conditioned so that it leaves at a predetermined dew point and at a predetermined dry bulb temperature. However, the various points of distribution may serve areas requiring heating or cooling, depending upon load conditions affecting said areas. Thus, it may be desired to maintain one zone of an enclosure at a higher temperature than another zone differently located; or, because of different load conditions, one zone may require heating while another zone may require cooling, although it may be desired to maintain both zones at the same temperature. Applicant has devised simple and automatic regulation for tempering conditioned air received at a point of distribution so that such air may be augmented at said point by another volume of air which is either heated or cooled as desired, the mixture of both being delivered in a specified final condition.

A feature of the invention resides in the provision of a valve body arranged to cause conditioning fluid to pass therethrough in one of a plurality of courses depending upon the temperature of the valve body. As a result, under conditions requiring either heating or cooling, conditioning fluid for causing required heating and cooling will be delivered in a predetermined course to a conditioning unit where a volume of air will be tempered as desired by heat exchange with the fluid so delivered. The same structure constitutes, in effect, a sensitive element operating differently during different seasons of the year. Both cold and hot fluids are handled by the same device, but in different paths, reflecting the requirements of different seasonal needs.

A further feature comprises the correlation of a modulating device with the seasonal switch-over device, both arranged in the same structure, the modulating device reflecting local conditions in a particular zone, metering the quantity of desired liquid fed into a particular conditioning unit.

Another feature provides for a closed circuit containing an expansible fluid, adapted to expand and contract responsive respectively to increase and decrease of temperature, said circuit causing the regulating element to meter desired quantities of tempering fluid according to the needs or wishes of an operative.

With applicant's control arrangement, only a small percentage of total air requirements need be handled at a central point of conditioning, with the result that duct structures leading from said point to the areas of conditioning may be made relatively small. The remaining air required for circulation as well as tempering may be drawn from the zones or areas of conditioning for mixture with the small quantity of air delivered from the central point. In addition, because tempering when required, whether heating or cooling, is carried on in the zones of conditioning, the air delivered from the central station need not in many instances be intensively conditioned, and this again makes for greater economy and flexibility.

An illustrative embodiment of applicant's invention is described in the following specification to be read in connection with the accompanying drawings in which:

Fig. 1 is a diagrammatic representation of applicant's control mechanism; Fig. 2, a plan of part thereof.

Fig. 3 is a plan view of the limit regulating control portion of applicant's regulating mechanism.

Fig. 4 illustrates diagrammatically the application of applicant's mechanism to an air conditioning system which it is adapted to serve, and Fig. 5 is a diagrammatic sectional view, showing the interior of the unit employed in the system of Fig. 4.

Considering the drawings, similar designations referring to similar parts, and first referring to the system of Fig. 4, numeral 4 designates a thermal sensitive element preferably positioned in the path of air passing through tempering coil 5. Conditioned air from a central point of conditioning, not shown, is delivered to one or more units 6, the air being delivered at relatively high pressure within the units through nozzles 7 from plenum 8. The discharge of air within unit 6 causes an induction of secondary air through tempering coil 5; and this air contacts thermal sensitive element 4, immediately responding to the condition of this air. Normally, the secondary air is from the area or zone served by the unit and hence thermal sensitive element 4 will reflect conditions within the zone. The fluid entering the tempering coil from feed line 9 may be either hot or cold, as will be described hereinafter.

Considering now the operation of the control mechanism illustrated in Fig. 1, and assuming a summer operating condition, thermal sensitive element 4 will reflect the temperature of the air in the area or zone served by unit 6. If, for example, the temperature in the conditioned zone exceeds a desired point, the fluid 10 within the thermal sensitive element will tend to expand. Fluid 10 fills a closed circuit including the space within thermal sensitive element 4, tubing 11, connecting the thermal sensitive element and valve operating mechanism 12, bellows 13 and connecting line 13 within the modulating portion of the mechanism, tubing 14 connecting mechanism 12 with limit regulating control 15 and the bellows and connecting tubing 16 within control 15.

Examples of fluid 10 which may be used in the said closed circuit are ether, dichloromethane, and similar fluids which will suggest themselves to those skilled in the art.

Assuming that cooling fluid is feeding from line 9 into mechanism 12, the body of mechanism 12 will have been cooled down so that expansible fluid within bellows 17 will be contracted so that the valve poppet 18 will be seated at the bottom and open at the top. This is because spring 19 will force down valve poppet 18 since substantially no pressure exists in bellows 17 for causing rod 20 to push the valve in the opposite direction.

Since thermal sensitive element 4 is also reflecting a condition calling for the admission of cooling fluid to the unit, fluid 10 will have expanded within the closed circuit described so that bellows 13 will be expanded to cause valve poppet 21 to be seated at the bottom. Consequently, the cold fluid will flow from line 9 through strainer 22, upper path around the top of valve poppet 18, port 23 around the top of valve poppet 21 out through discharge opening 24 and into the coil 5 of unit 6.

Assuming, however, that under the same summer operating condition, the temperature in the conditioned zone is within desired limits; then thermal sensitive element 4 will not be affected to the point where fluid 10 will expand sufficiently to cause bellows 13 to downseat valve poppet 21. The valve poppet 21 will stay top-seated and bar the passage of cold fluid to the tempering coil. It is only when element 10 reflects a condition too warm for comfort, or at least higher than a desired maximum, that the valve poppet will downseat and allow cooling fluid to pass to the tempering coil.

Since different individuals may require different degrees of cooling, applicant provides a limit regulating control 15 with a knob or the like 25 so that by manipulating the knob, the circuit for fluid 10 may be extended or contracted. If extended, a warmer condition will be permitted to develop under summer operating conditions, whereas if contracted, the reverse will take place.

The limit regulating control 15 includes an outer casing 26 housing a control rod 27 fitted within a threaded sleeve 28 in turn engaging internal threaded head 29 of casing 26. Spring 30 fitted between stop plates 31 and 32 exert a pressure upon actuating element 33 resting upon the head of bellows 16 to cause the bellows to be contracted or expanded depending upon the direction of rotation of knob 25.

In order more readily to reflect the condition of air contacting thermal sensitive element 4, it embraces an outer shell 34 equipped with extended surfaces so that sensitivity to temperature changes will be increased because of increased ability to dissipate heat rapidly.

Obviously, the limit regulating control may be variously constructed to achieve the same object, that is, vary the space in which bellows 16 is housed so as to allow the bellows to expand or cause it to contract. Similarly, no limitation is made with respect to the structure of the thermal element since various expedients may be used to enable it rapidly to reflect temperature changes.

Under winter operating conditions, when heating fluid is fed from line 9, the valve body of mechanism 12 adjacent valve poppet 18 will be heated up sufficiently to cause bellows 17 to expand to the point where valve poppet 18 will be top seated so that the hot fluid will be enabled to flow about the bottom of valve poppet 18. If the conditioned zone requires more heat, thermal sensitive element 4 will be affected to the point where fluid 10 will contract thus causing pressure of spring 35 to top seat valve poppet 21 and permit heated fluid to flow beneath the valve poppet and out through discharge opening 24 to the unit 6.

The course of cooling fluid is indicated by a dash line whereas the course of heating fluid is indicated by a dot and dash line.

Under some conditions, it may be desirable to utilize heating fluid in some zones and cooling fluid in other zones, responsive to varying requirements in said zones. In the arrangement of Fig. 1, thermostat T, operative responsive to temperature conditions in a particular zone, controls three-way valve 36 so that heating fluid from a desired source may be admitted from line 37 or cooling fluid from another desired source admitted from line 38.

In Fig. 4, a supply of cold water from a desired source, such as a well, or cooler, feeds into three-way valve 39 and is then discharged by pump 40 into line 9 which may serve one or more units 6, the fluid returning from units 6 flowing through return line 41 to waste, as shown, or back to the three-way valve 39 depending upon the condition of the valve. Thermostat T¹ controls the operation of valve 39, said thermostat being normally positioned within the conditioned area or in a plenum reflecting conditions in one or more zones, as desired. Heater 42 and three-way valve 43 are provided so that when heating fluid is required, the course will be from heater 42 through line 44, said line 9, the units 6, return line 41, valve 39 which will be in one position for receiving only return fluid, pump 40, three-way valve 43 and line 45. Responsive to the action of thermostat T¹, valve 43 will operate to apportion the return fluid so that part thereof may be returned for reheating and the remainder pass through to line 9. Steam connection 46 is provided to serve the heater and check valve 47 enables the water from valve 43 to pass to line 9 without permitting flow into line 44.

The valve operating mechanism, therefore, operates under both summer and winter conditions; and may operate in any season of the year to provide either cooling or heating, or both cooling and heating, with the result that any desired or required tempering may take place at any point of distribution to meet specifications or the wishes of occupants.

Safety valve 48 is operated responsive to a rise in pressure in line 9 beyond a desired maximum, whereupon valve 48 will open and allow bypassing of water as shown by the arrow.

Since many changes may be made in the invention without departing from the scope thereof, it is intended that all matter set forth in the above description, or shown in the accompanying drawings be regarded as illustrative only and not in a limiting sense.

I claim:

1. In a control valve, a plurality of passages for routing conditioning fluid therethrough, a thermal sensitive element in the valve, a valve seat arrangement, means including said element operative responsive to changes in temperature of the body of the valve for causing said arrangement to permit conditioning fluid to pass through a desired one of a plurality of courses through the valve, and means operative responsive to variations in atmospheric conditions of an area to be air conditioned for permitting said fluid to be discharged from the valve.

2. In a control valve a first upper passage, a first lower passage, a second upper passage, a second lower passage, means for admitting a first fluid to the valve, means operative responsive to the temperature of said first fluid for causing one of said first passages to be open and the other to be closed, means including a thermostatic fluid for controlling the flow of said first fluid thru the second passages of the valve, and means for causing one of said second passages to be open and the other second passage to be closed, said means for causing one of said second passages to be open and the other second passage to be closed being operated by said means including a thermostatic fluid.

3. In a control arrangement of the character described a valve, a plurality of passages in said valve whereby a fluid may pass therethrough in a plurality of courses, means for admitting a fluid to said valve for passage therethrough, means responsive to the temperature of said fluid for causing one of said courses to be opened to the passage of the fluid when the fluid is above a predetermined temperature limit and for causing another of said courses to be opened to the passage of said fluid when the fluid is below a predetermined temperature limit, a second series of passages and means operative responsive to variations in atmospheric conditions of an area to be air conditioned for permitting said fluid to enter a desired one of said second series of passages for discharge from the valve.

4. In a control arrangement of the character described, a valve body, a thermal sensitive element, a closed thermostatic fluid circuit including said element and passages within said valve body, other passages within said valve body for permitting a conditioning fluid to pass through the valve body, a first valve element and a second valve element within the valve body, means operative responsive to the temperature of the valve body as reflected by the temperature of the conditioning fluid for operating said first valve element, and means including said closed thermostatic fluid circuit for operating said second valve element to permit conditioning fluid to pass through the valve body.

5. In a control arrangement according to claim 4, a plurality of courses within the valve body connecting with said other passages, said first valve element governing the flow of heated conditioning fluid through one course and the flow of cooled conditioning fluid through another course, said second valve element permitting the conditioning fluid to pass out of the valve body in desired volume.

6. In a control arrangement according to claim 4, means for varying the size of the closed fluid circuit, whereby the flow of conditioning fluid from the valve may be initiated at a prescribed temperature, either below or above a desired point.

7. In a temperature regulator for controlling the flow of either a cooling medium or a heating medium to the same heat exchanger, the combination of a valve member, a pair of ported valve seats with which said valve member is adapted to cooperate, a thermostat subjected to the temperature to be controlled and operatively connected to said valve member, and means automatically responsive to the temperature of the medium flowing into said regulator for predetermining whether said medium shall flow to one or the other of said valve seats.

8. In a temperature regulator for controlling the flow of either a cooling medium or a heating medium to the same heat exchanger, the combination of a valve member, a pair of ported valve seats with which said valve member is adapted to cooperate, a thermostat subjected to the temperature to be controlled and operatively connected to said valve member, means responsive to the temperature of the medium flowing into the regulator for determining whether said medium shall flow to one or the other of said valve seat ports, and means for adjusting said valve member with respect to its seats to predetermine the temperature at which said valve member shall engage the effective seat for discontinuing the flow of said medium.

9. In a temperature regulator for controlling the flow of either a heating medium or a cooling medium to the same heat exchanger, in combination with a casing having inlet and outlet connections, a pair of opposed valve seats in said casing, a single valve member adapted to cooperate with one or the other of said valve seats, a thermostat subjected to the temperature to be controlled and operatively connected to said valve member to move the same with respect to its respective valve seats, and thermostatically operated valve mechanism in said casing responsive to the temperature of the medium flowing into said casing for determining whether said medium shall flow to one or the other of said ported valve seats.

10. In a temperature regulator for controlling the flow of either a heating medium or a cooling medium to a heat exchanger, in combination with a casing provided with inlet and outlet connections, a pair of ported valve seats in said casing, a single valve member for cooperating with one or the other of said valve seats, a thermostat including a motor vessel operatively connected to said valve member and a bulb in communication with said vessel, said vessel and bulb being filled with a thermosensitive liquid, a second valve mechanism in said casing for determining whether the medium flowing into said casing shall flow to one or the other of said valve seats, and means responsive to the temperature of the medium flowing into said casing for operating said last named valve mechanism.

11. In a valve arrangement of the character described a first double seated valve, a second double seated valve, a housing for said valves, means for admitting conditioning fluid into the housing thereby changing its temperature, a thermal sensitive element operative responsive to changes in temperature of the housing for causing the first valve to assume one position when heated fluid is admitted to the housing and a different position when cooled fluid is admitted to the housing, a thermal sensitive element outside the housing for reflecting changes in atmospheric conditions of an area to be air conditioned, and means controlled by said element for causing the second valve to assume one position under winter operating conditions when heated fluid is desired to be discharged from the housing and a different position under summer operating conditions when cooled fluid is desired to be discharged from the housing.

WILLIS H. CARRIER.